W. H. THIEMER.
UNIVERSAL JOINT.
APPLICATION FILED JUNE 23, 1919.

1,381,599.

Patented June 14, 1921.

Inventor
William H. Thiemer

UNITED STATES PATENT OFFICE.

WILLIAM H. THIEMER, OF CLEVELAND, OHIO, ASSIGNOR TO THE PETERS MACHINE AND MANUFACTURING COMPANY, OF CLEVELAND, OHIO, A CORPORATION OF OHIO.

UNIVERSAL JOINT.

1,381,599. Specification of Letters Patent. Patented June 14, 1921.

Application filed June 23, 1919. Serial No. 306,079.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to a construction and arrangement of parts which will permit of the convenient assembling of the various parts thereof and the efficient lubrication of the journals or bearings for the trunnions.

Figure 1:
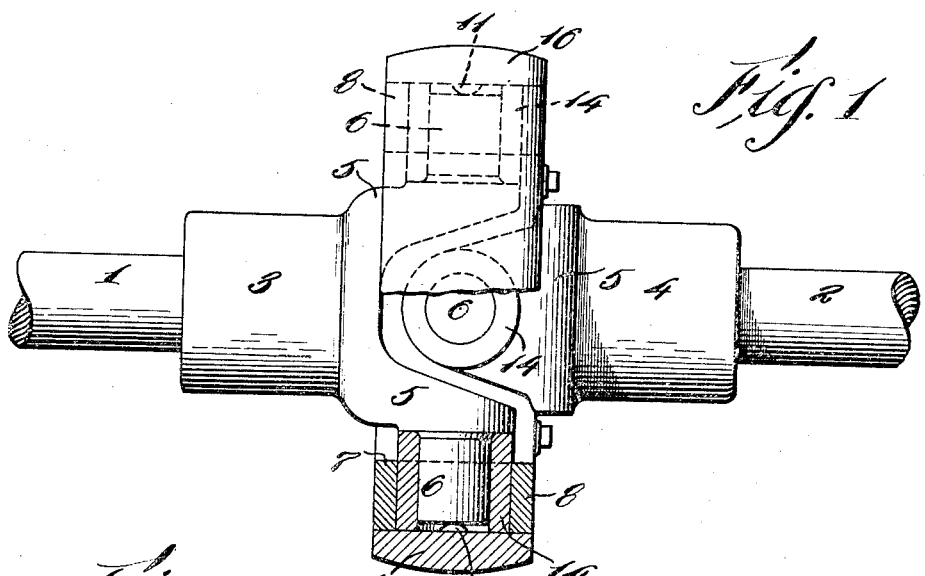
Figure 2:
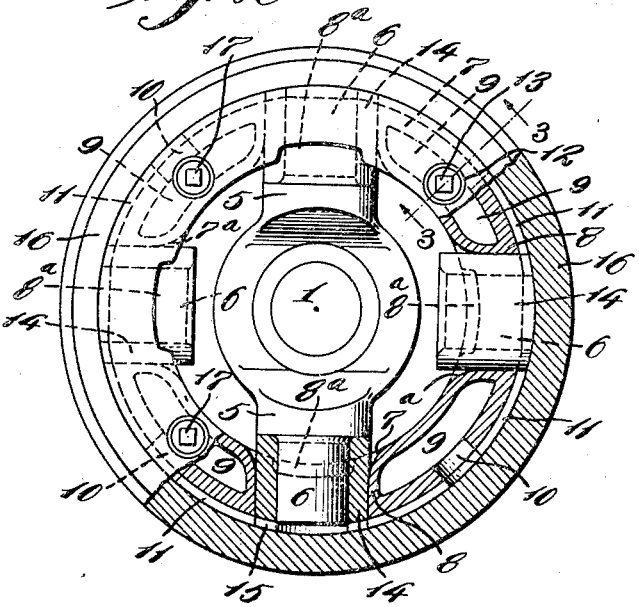
Figure 3:
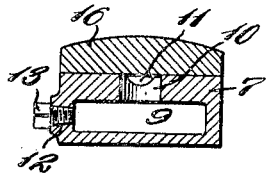
Figure 4:
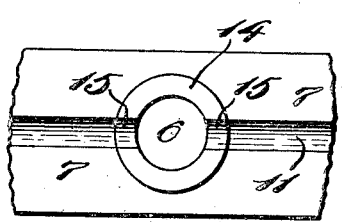

In the drawings forming part hereof, Figure 1 represents a sectional side elevation of a joint constructed in accordance with my invention; Fig. 2 an elevation of the ring which connects the opposed shaft sections, certain parts being shown in section; Fig. 3 a sectional view corresponding to the line 3—3 of Fig. 2; Fig. 4 a detail in elevation of the inner member of the connecting ring showing the journal and bushing; and Fig. 5 a view similar to Fig. 3 of a modified form of the invention.

Describing the parts by reference characters, 1 and 2 denote a pair of shaft sections adapted to be united by my universal joint, said sections having thereon hubs 3 and 4 respectively, each hub being provided with a yoke the forks 5 whereof are provided with trunnions 6. The yoke forks are comparatively narrow to permit of the insertion of the trunnions into the connecting cross member or ring.

Coöperating with the trunnions on the yokes is a ring comprising an inner annular section and an outer annular section, the two sections providing jointly therebetween means for distributing to the journals lubricant supplied to the inner ring member. The inner ring member is indicated generally at 7 and is provided with cylindrical journals 8 for the reception of the trunnions and the bushings surrounding the same. Between adjacent journals, the ring is provided with chambers 9 for lubricant, four such chambers being shown and each being provided with a radial port 10 extending to the outer cylindrical surface of the inner ring, and preferably located midway between the lateral edges of the outer cylindrical surface of said ring. At their outer ends, each of the ports 10 communicates with a groove 11 which is formed within and extends circumferentially around the inner ring, preferably midway between the lateral edges of its outer cylindrical surface. One of the chambers 9 is provided with a filling opening 12 closed by a removable plug 13.

The trunnions of each yoke may be applied to the inner ring by inserting one of such trunnions into the appropriate journal, there being sufficient clearance between the inner surface of the ring and the outer surface of the yoke forks to permit the trunnion thus inserted to be moved outwardly until the opposite trunnion may be inserted into the opposite journal. The insertion of the trunnion into their journals may be facilitated by recessing the journals, as indicated at 8ª and by rounding off the inner wall of the inner ring section adjacent to the journals, as shown at 7ª, thus providing the necessary clearance without unduly enlarging the said section. After the trunnions have been thus inserted, bushings 14 will be slipped over the trunnions and between the same and their respective journals. When assembled, the outer ends of the trunnions will be preferably flush with the inner edge of the groove 11, the bushings projecting outwardly as far as the outer surface of the inner ring and each being provided with ports 15 adapted to register with the sections of the groove 11 on opposite sides thereof.

When the parts have been thus assembled, an outer ring member 16 will be forced upon the inner ring member, as by means of a press, the inner cylindrical surface of the outer ring member forming with the outer cylindrical surface of the inner ring member a tight leak-proof joint. After having been so assembled, the plug 13 will be removed and lubricant will be forced under pressure into the chamber 9 which is provided with the filling opening and will be distributed by means of the groove 11 and ports 15 to the other chambers of the inner ring member, thereby filling the entire lubricant space in the ring. To facilitate this filling under pressure, the other chambers 9 will be provided each with a vent opening which may be closed by a plug 17.

Figure 5:
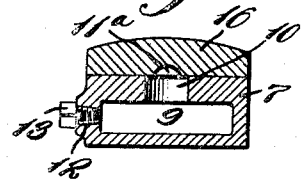

It will be obvious that, if desired, the channel for the distribution of lubricant may be provided within the inner cylindrical surface of the outer ring member, in which case it will be unnecessary to provide the bushings 14 with ports 15. This construction is shown in Fig. 5 wherein the outer ring member 16 is shown as provided with a groove 11ᵃ projecting outwardly from the inner cylindrical surface thereof and located midway between the lateral edges of said member.

By the construction illustrated and described herein, it will be evident that I have produced a joint which may be conveniently assembled and disassembled and one wherein the lubrication of the bearings for the trunnions may be accomplished effectively through centrifugal action.

Having thus described my invention, what I claim is:—

1. In a universal joint, the combination of a pair of shaft sections each provided with trunnions, an inner member having journal openings extending therethrough for said trunnions and provided with a chamber for lubricant having an outlet extending outwardly therefrom, and an outer member secured to the inner member and serving to close the outer ends of said journal openings, there being a groove for lubricant provided between the outer surface of the inner member and the inner surface of the outer member with which said outlet communicates and serving to conduct lubricant to the journals of the inner ring member.

2. In a universal joint, the combination of a pair of shaft sections each provided with trunnions, an inner member having journal openings extending therethrough for said trunnions and provided with chambers arranged between said journals and each having an outlet extending outwardly therefrom, and an outer member secured to the inner member and serving to close the journal openings, there being a groove formed between the inner and the outer members with which the said outlets communicate for the purpose of supplying lubricant from said chambers to the said journals.

3. In a universal joint, the combination of a pair of shaft sections each having trunnions, an inner member having journals extending therethrough for said trunnions, bushings in said journals surrounding said trunnions respectively, the outer ends of the trunnions terminating within the outer surface of the inner member and the bushings extending outwardly substantially as far as the outer surface of such member and each provided with a pair of ports, the said inner member being provided with a groove extending therearound and communicating with the bushing ports, and an outer member secured to the inner member and serving to close the outer ends of the journal openings.

4. In a universal joint, the combination of a pair of shaft sections each having trunnions, an inner member having journal members extending therethrough for said trunnions and provided with chambers for lubricant between said journals, each chamber having an outwardly extending port and the inner member having on its outer surface a groove extending therearound and with which said ports communicate, a bushing in each journal surrounding its trunnion, each trunnion terminating within the inner end of its journal opening and each bushing extending outwardly to the outer end of such opening and being provided with a pair of ports adapted to register with the groove, an outer ring member secured to the inner ring member and serving to close the journal openings and to provide with said groove a channel for lubricant, and means for supplying lubricant to one of said chambers.

In testimony whereof, I hereunto affix my signature.

WILLIAM H. THIEMER.